Sept. 13, 1960     J. E. COLLINS     2,952,246

VALVE

Filed July 12, 1957

INVENTOR.
JOHN E. COLLINS
BY Bates, Teare & McBean
ATTORNEYS

# United States Patent Office 2,952,246
Patented Sept. 13, 1960

2,952,246

VALVE

John E. Collins, Akron, Ohio, assignor, by mesne assignments, to International Basic Economy Corporation, New York, N.Y., a corporation of New York Filed July 12, 1957, Ser. No. 671,543

10 Claims. (Cl. 121—46.5)

This invention relates to valves and more particularly to valves which are used for controlling the flow of fluids in gaseous or liquid systems.

Many types of control valves employ a plunger that is displaceable in a bore in the valve housing in response to pressurized fluid acting on one or both ends of a head on the plunger or on one or both ends of the plunger. Pressurized fluid is always maintained on one end of the plunger head or on one end of the plunger, the displacement of the plunger being effected by a difference in cross-sectional area of the two ends of the plunger head, or of the two ends of the plunger, whichever the case may be. The valve may be triggered by either a single or double solenoid operated pilot control member which controls the flow of pressurized fluid to and from one end of the plunger head or one end of the plunger. The pressurized fluid that is to be controlled flows over necked-down portions of the plunger, with control of the fluid being effected by the axial displacement of the plunger in the valve housing, which opens and closes inlet and exhaust ports in a predetermined manner therein, thus actuating a piston-cylinder mechanism or the like which the valve may control.

In many applications it is necessary that the valve control a plurality of piston-cylinder mechanisms or the like. Accordingly, a longer plunger is required having an increased number of necked-down portions thereon. Obviously, as the length of the plunger increases, its weight increases and it becomes difficult to reciprocate the same quickly and accurately, particularly when the fluid pressure is low. As a result, operation of the valve is often slow, undependable and highly inflexible.

An object of the invention is to provide a plunger control valve which affords dependable operational control of the plunger.

Another object of the invention is to provide a plunger control valve wherein the speed of operation of the plunger is substantially increased.

A further object of the invention is to provide a valve having opposed-piston type plungers for controlling the flow of fluid through the valve.

A further object of the invention is to provide a plunger control valve that is efficient, durable, and requires little maintenance and which affords complete flexibility of operation.

Briefly, the foregoing objects are accomplished by the provision of a valve having opposed-piston type plungers for controlling the flow of pressurized fluid through the valve. The plungers are disposed in spaced, opposed relation in a longitudinal bore in the valve housing and are adapted for reciprocation therein. Each of the plungers includes a stem portion having a pressure head at one end and a poppet valve heead at the other end, which is smaller in diameter than the pressure head and is adapted to open and close supply, exhaust and inlet ports in the valve housing in a predetermined manner. The plungers are disposed in the valve housing bore in a manner whereby the respective pressure heads oppose each other, there being a space or chamber between the heads. Pressurized fluid is always maintained on the outer or smaller ends of the pressure heads or the outer or smaller ends of the plunger, thereby normally biasing the plungers to a central position in the bore. A solenoid operated pilot control valve may be used to control the flow of pressurized fluid to and from the space between the inner or larger ends of the respective pressure heads to reciprocate the plungers, the reciprocation being effected by the aforedescribed difference in cross sectional area of the respective ends of the plungers which are exposed to pressurized fluid. The supply and exhaust ports in the valve housing may be arranged whereby one of the plungers may be supplying pressurized fluid to a piston-cylinder mechanism or the like which the valve may control, while the other plunger is exhausting pressurized fluid from another piston-cylinder mechanism which the valve concurrently controls. With this construction, a single solenoid operated pilot control member may be used to operate two plungers and, in turn, two piston-cylinder mechanisms. Accordingly, a single compact valve may be used for controlling two piston-cylinder mechanisms in an expeditious, dependable and highly efficient manner.

Other objects and advantages of the invention will be apparent from the following description taken in conjunction with the drawings in which.

The valve illustrated is one which is adapted for use in controlling the flow of fluid under pressure from a source of supply to one or more outlet conduits. The mechanism may be triggered by a single solenoid operated pilot control member, which may be remotely controlled by an operator. Although the valve in the present instance takes the form of a four-way valve, the valve may be a two-way, three-way, or any other type of valve used for controlling the flow of pressurized fluid. In the present case, the valve may be made into a three-way valve by using one side of the valve with one end assembly only.

Figure 1:
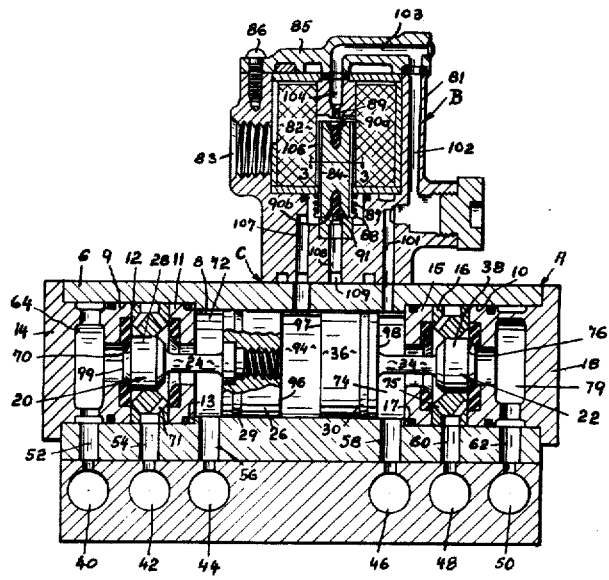
Fig. 1 is a front elevational sectional view of a solenoid operated opposed piston type of control valve constructed in accordance with the invention and showing the plungers in their respective outer positions in the valve housing; this view also shows a portion of the pressure head on the left plunger broken away to show the interior structural thereof.

Referring to Fig. 1, there is shown a plunger valve A having a single solenoid operated pilot control assembly B disposed thereon, which have completmentary meeting faces on the parting line C. The plunger valve A includes a housing or manifold 6 containing a longitudinal cylindrical bore 8 having the enlarged bore portions 9 and 10 at each end thereof respectively as shown. Disposed in the enlarged bore portion 9 are the annular spacer elements 11 and 12, which are retained therein against the bore shoulder 13 by the end cap 14 secured in the end of the bore. In a like manner, the annular spacer elements 15 and 16 are retained in the enlarged bore portion 10 against the shoulder 17 therein by the cap 18. The spacer elements and caps include a series of passageways and chambers through which pressurized fluid flows in a manner to be hereinafter described.

Within the bore 8 there is disposed a pair of reciprocable plungers 20 and 22, which operate to control the flow of pressurized fluid through the valve A. The plunger 20 includes a stem portion 24 having a fluid pressure retaining head 26 on its inner end and having a poppet valve head 28 on the outer end thereof. The plunger 22 is similarly constructed and includes a stem portion 34 having a fluid pressure retaining head 36 on the inner end thereof and a poppet valve head 38 on its outer end. Each pressure head may be threaded onto the plunger stem portion as shown in the plunger 20 in Fig. 1, or may be otherwise secured thereto by any suitable means. The poppet valve heads 28 and 38 are adapted to open and close fluid passageways and ports in the valve housing or manifold 6 as will be hereinafter described. The pressure heads 26 and 36 carry the seal rings 29 and 30 respectively, which have a sliding, fluid-tight contact with the longitudinal wall of the bore 8 to prevent the flow of fluid thereby.

The valve housing 6 includes a series of ports 40, 42, 44, 46, 48 and 50, which are in communication with the bore 8 of the housing through the passageways 52, 54, 56, 58, 60 and 62 respectively. The plunger 20 controls the flow of pressurized fluid through the left end assembly which includes the left group (Fig. 1) of ports represented by the ports 40, 42 and 44, while the plunger 22 controls the flow of pressurized fluid through the right end assembly which includes the right group of ports represented by the ports 46, 48 and 50.

A feature of the invention is the interchangeability of the ports in each of the end assemblies with respect to their being inlet, cylinder and exhaust ports. In the present instance, port 40 is an inlet port, port 42 a cylinder port and port 44 an exhaust port. However, port 40 may be an exhaust port and port 44 an inlet port. In the right group of ports, port 46, in the present instance, in an inlet port, port 48 a cylinder port and port 50 an exhaust port. However, port 46 may be an exhaust port and port 50 an inlet port.

The term inlet port, as used herein, has reference to the port as being connected to a suitable source of pressurized fluid. The term exhaust port refers to the port as being connected to an exhaust chamber or open to the atmosphere. The term outlet or cylinder port has reference to the port as being connected to one or more piston-cylinder mechanisms or the like which the valve A may control.

Figure 2:
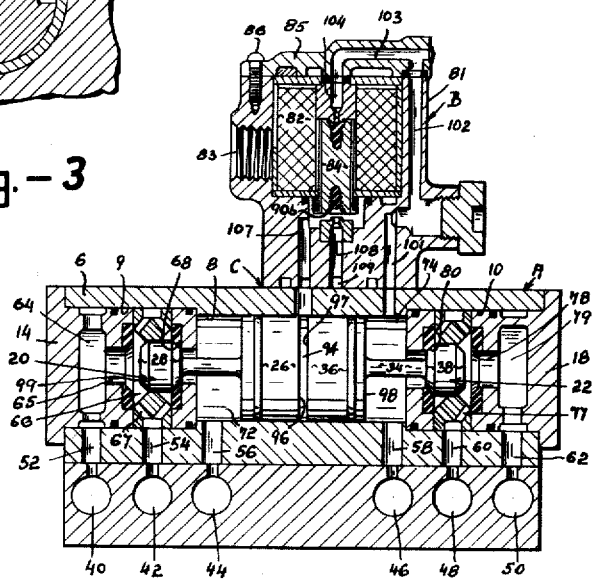
Fig. 2 is a front elevational sectional view similar to Fig. 1, but showing the plungers disposed at their inner positions in the valve housing.

Control of the flow of pressurized fluid through the valve A is effected by controlling the position of the plungers 20 and 22 in the bore 8. When the plunger 20 is in its right-hand position in the bore as shown in Fig. 2, pressurized fluid may flow from the inlet port 40, up the passageway 52, into the chamber 64, through the passageway 65, into the chamber 66, down the passageway 67, down the passageway 54 and out the cylinder port 42 to a piston-cylinder mechanism or the like. At this point, the plunger head 28 sealingly engages the valve seat or annular seal 68, thereby preventing fluid flow from the cylinder port 42 to and out the exhaust port 44. When the plunger 20 is in its left-hand position in the bore as shown in Fig. 1, the flow of inlet pressurized fluid from the port 40 is stopped by the engagement of the plunger head 28 with the valve seat or annular seal 70. At the same time, pressurized fluid may exhaust from a piston-cylinder mechanism and into the port 42, up the passageway 54, up the passageway 71, past the plunger stem 24, into the chamber 72, down the passageway 56, and out the exhaust port 44.

When the plunger 22 is in its right-hand position in the bore, as shown in Fig. 1, pressurized fluid may flow from the inlet port 46, up the passageway 58, into the chamber 74, past the plunger stem 34, down the passageway 75, down the passageway 60 and out the cylinder port 48 to a second piston-cylinder mechanism or the like. At this point, the plunger head 38 engages the valve seat or annular seal 76 and prevents the flow of fluid from the cylinder port 48 to the exhaust port 50. When the plunger 32 is in its left-hand position in the bore (Fig. 2), pressurized fluid may flow from the second piston-cylinder mechanism through the port 48, up the passageway 60, up the passageway 77, through the passageway 78, into the chamber 79, down the passageway 62 and out the exhaust port 50. At the same time, the flow of inlet fluid from the port 46 to the cylinder port 48 is stopped by the engagement of the plunger head 38 with the valve seat or annular seal 80.

Reciprocation of the plungers 20 and 22 is controlled by the solenoid operated pilot control valve B, which will now be described. The valve B (Fig. 1) comprises a body or housing 81 in which is fixed the solenoid coil 82, which is in accessible communication with the junction box portion 83 of the body. Within the solenoid coil 82 an armature 84 is vertically reciprocable, responsive of course to energization and deenergization of the solenoid coil 82 by any suitable timer device. A cap 85 is retained on top of the housing 81 by the cap screws 86. To assist in retaining the armature 84 in its lower position within the solenoid coil 82 when it is deenergized, a spring 87 is provided which encompasses the lower end of the armature and acts between the lower end of the coil 82 and the flange 88 on the lower end of the armature as shown. Disposed in the upper end of the armature 84 is a valve seat or head 90a which is adapted to seat against the lower end of the orifice 89 when the armature is in its upper position within the solenoid coil thus preventing the flow of fluid thereby. Similarly, the lower end of the armature is provided with a valve seat 90b which seats against the upper end of the orifice 91 when the armature is in its lower position to seal the flow of fluid thereby.

The plungers 20 and 22 are reciprocated by admitting and discharging pressurized fluid to and from the chamber 94. With respect to the plunger 22, pressurized fluid is always maintained in chamber 74 and against the right end 98 of the head 36 thereof, since the chamber 74 is in direct communication with the inlet port 46 through the passageway 58. Accordingly, when pressurized fluid is exhausted from the chamber 94, the pressurized fluid in chamber 74 acts on the right end 98 of the plunger head 36 and forces the plunger to its left end or inner position in the bore. When pressurized fluid is admitted to chamber 94 and against the inner end 97 of the plunger, it forces the same to its right end position in the bore since the plunger inner end 97 has a greater cross-sectional area than the outer end 98 thereof.

With respect to the plunger 20, pressurized fluid is always maintained in the chamber 64 and against the outer or left end 99 of the plunger 20, since the chamber 64 is in direct communication with the inlet port 40 through the passageway 52, thereby displacing the plunger to its right end or inner position in the bore when the pressurized fluid in chamber 94 is exhausted. When pressurized fluid is admitted to the chamber 94 and against the inner end 96 of the plunger 20, the plunger is displaced to its left end or outer position in the bore since the inner end 96 has a greater cross-sectional area than the outer end 99 thereof.

Since the inlet port 40 and the exhaust port 44 are interchangeable as aforedescribed, reciprocation of the plunger 20 may be effected by constantly maintaining pressurized fluid in the chamber 72 instead of the chamber 64. In a like manner, since ports 46 and 50 are interchangeable, reciprocation of the plunger 22 may be effected by constantly maintaining pressurized fluid in the chamber 79 instead of the chamber 74.

Figure 3:
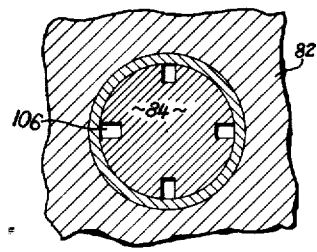
Fig. 3 is a transverse sectional view on an enlarged scale of the solenoid armature taken along the lines 3—3 of Fig. 1.

To reciprocate the plunger 22 to its outer or right end position and the plunger 20 to its outer or left end position in the bore, the solenoid coil 82 is deenergized thereby allowing the armature 84 to return to its lower position in the solenoid pilot control valve. This permits pressurized fluid to flow from the inlet port 46 (Fig. 1), up the passageway 58, into the chamber 74, up the passageway 101, up the passageway 102, across the passageway 103, down the passageway 104, past the open valve head or seat 90a (this valve being open because the armature 84 is in its lower position), through the slots 106 (Fig. 3) in the armature side, through the passageway 107 (Fig. 1) in the housing 81 and into the chamber 94 in the valve housing 6, thus forcing the plungers 20 and 22 to their outer positions in the bore 8 as shown in Fig. 1.

The plungers 20 and 22 may be reciprocated to their inner positions in the bore 8 by exhausting the pressurized fluid from the chamber 94. This is accomplished by energizing the solenoid coil 82, which raises the armature 84 to its upper position in the pilot control valve B, as shown in Fig. 2, thereby opening the lower armature valve seat 90b. This permits the pressurized fluid in the chamber 94 to exhaust up the passageway 107, past the open valve seat 90b, down the exhaust passageway 108 and out the exhaust port 109 which is open to the atmosphere (not shown). When the plungers 20 and 22 are disposed at their inner positions in the bore 8 (Fig. 2), the opposed pressure heads 26 and 36 respectively thereon do not contact each other, such that the chamber 94 still remains, but is substantially reduced in size.

The opposed-piston principle as applied to the plungers 20 and 22 aforedescribed, in conjunction with the interchangeability feature of the respective ports 40 through 50, enables the valve A to handle a large variety of applications yet, at the same time, renders the valve remarkably compact, thoroughly dependable and adaptable to high speed operation.

With reference to the structure shown in Figs. 1 and 2, it will be understood that each of the plungers 20 and 22 may be used independently of the other. Thus the valve A may be adapted to control a single piston-cylinder mechanism by using either the end assembly containing the plunger 20 or the end assembly containing the plunger 22, whichever is desired or convenient.

The terms and expressions which have been employed are used as terms of description, and not of limitation, and there is no intention, in the use of such terms and expressions, of excluding any equivalents of the features shown or described, or portions thereof, but it is recognized that various modifications are possible within the scope of the invention claimed.

I claim:

1. A valve comprising, a housing having a bore therein and having a plurality of spaced passageways extending from the exterior surface of the housing to the bore, a first plunger disposed in the bore for reciprocation therein, a second plunger disposed in the bore in spaced opposed relation to said first plunger for reciprocation therein, means on each of said plungers for controlling the flow of fluid between certain of said passageways when said plungers are reciprocated to predetermined positions in the bore, said plungers having actuation surfaces responsive to fluid pressure for reciprocating the plungers, and a single pilot valve operable to alternately communicate and exhaust fluid pressure on the actuating surfaces of both plungers simultaneously to effect synchronous reciprocation of said plungers.

2. A valve comprising, a housing having an internal bore therein and having a plurality of interchangeable spaced inlet, outlet and exhaust passageways extending from the exterior surface of the housing to the bore, said housing containing a plurality of valve seats disposed in the bore between certain of said passageways, a first plunger disposed in the bore for reciprocation therein, and a second plunger disposed in the bore in spaced opposed relation to the first plunger for reciprocation therein, each of said plungers comprising a stem portion having a pressure head on the inner end thereof and a poppet head on the outer end thereof, each of said poppet heads being disposed between certain of said valve seats and adapted to sealingly engage the same in a predetermined manner to control the flow of pressurized fluid between certain of said passageways when the plungers are reciprocated to predetermined positions in the bore, said spaced opposing pressure heads defining a pressure chamber in said bore, and a pilot valve operable to alternately communicate and exhaust fluid pressure to said chamber and hence to said pressure heads to effect synchronous reciprocation of said plungers.

3. A valve constructed in accordance with claim 2 having a solenoid operated pilot control valve for controlling the flow of pressurized fluid that reciprocates the plungers.

4. A valve comprising a housing having a bore, a pair of plungers disposed for reciprocation in said bore, each plunger having a pressure head and a fluid flow control member extending from the pressure head, the plungers being disposed in the bore with said pressure heads in opposed axially spaced relation to define with the bore a closed chamber between said pressure heads and with their respective valve members extending away from said chamber, ports communicating with the bore and associated with the respective fluid flow control members of the plungers, surfaces responsive to fluid pressure on each plunger and means for communicating said surfaces with fluid pressure to force said plungers axially toward each other in said bore, and means for communicating fluid pressure into said chamber and against said pressure heads to force said plungers apart from each other against the opposing force of pressure acting against said surfaces.

5. A valve according to claim 4 wherein said means for communicating fluid pressure to said chamber is a solenoid-operated pilot valve to selectively admit and exhaust fluid pressure from said chamber while said surfaces are maintained in communication with fluid pressure to effect simultaneous reciprocation of said plungers.

6. A valve comprising a body portion, two plungers disposed for reciprocation inside the body, each plunger having a head portion responsive to fluid pressure to reciprocate the plunger and having a fluid flow control member attached to and movable with the head portion, flow ports in the body associated with the respective flow control member of each plunger, actuation surfaces responsive to fluid pressure on each plunger and means for communicating fluid pressure to said surfaces to urge the respective plungers toward predetermined locations in the body, and a single pilot valve having a flow port communicating jointly with both plungers on corresponding sides of their respective head portions, said pilot valve being operable alternately to communicate pressure to said sides of the head portions and thereby effect displacement of said plungers against the opposing force of fluid on said surfaces, and to exhaust pressure from said sides and thereby effect reverse displacement of the plungers.

7. A valve according to claim 6 wherein said flow control member of each plunger is a poppet head, and there being a seat portion in the body intermediate the respective flow ports of each plunger to engage said poppet head.

8. A valve comprising a body, two plungers disposed in the body for reciprocation, each plunger having a head portion with a large pressure-responsive area on one side and a smaller effective area on the opposite side and having connected to and projecting from its side of smaller area a fluid flow-control member, flow ports in the body associated with the respective flow control members of the plungers, means for communicating a fluid pressure source with the smaller area of the head of one plunger to urge the latter to a predetermined location in the body, means for biasing the other plunger to a predetermined location in the body, a pilot valve for communicating said pressure on said smaller area simultaneously to the larger area of the same plunger head and also to the larger area of the head of the other plunger to displace said plungers from said respective locations, and said pilot valve having a position for exhausting said pressure on the larger areas of said heads only whereby the plungers are returned to their respective predetermined locations by the force of said pressure on said smaller area and said biasing means, respectively.

9. A 4-way valve comprising a housing having a bore, a first plunger and a second plunger disposed for reciprocation in the bore, each plunger having a pressure head and a poppet head and a narrow stem inter-connecting said heads, and the plungers being disposed in the bore in axial alignment with their respective head portions adjoining to define with the bore a fluid-tight chamber, a set of poppet seats comprising an axially inner and an outer poppet seat in the body associated with each of the respective poppet heads of the plungers, each inner seat surrounding the stem of its respective poppet head, and ports associated with each said set of poppet seats for 3-way fluid flow control, means for communicating fluid pressure to the stem side of the head of said first plunger to bias its poppet head against its inner poppet seat, and also to the poppet head of the second plunger to bias its poppet head against its inner poppet seat, and a pilot valve for alternately admitting pressure fluid to said chamber between said heads while maintaining the aforesaid fluid communication to separate the plungers and effect engagement of their respective poppet heads with their outer seats, and for exhausting said chamber to effect reverse displacement of the plungers.

10. A valve according to claim 9 wherein said pilot valve is solenoid actuated and is arranged to communicate pressure fluid on said stem side of the first plunger head to said chamber to effect separating displacement of the plungers, and having an exhaust position closed to said stem side for exhausting said chamber.

References Cited in the file of this patent

UNITED STATES PATENTS

| | | |
|---|---|---|
| 2,404,514 | McClure | July 23, 1946 |
| 2,466,795 | Crot | Apr. 12, 1949 |
| 2,567,073 | Kupiec | Sept. 4, 1951 |
| 2,611,391 | Sainsbury et al. | Sept. 23, 1952 |
| 2,619,121 | Renick | Nov. 25, 1952 |
| 2,718,876 | Williams et al. | Sept. 27, 1955 |
| 2,761,470 | Batts | Sept. 4, 1956 |
| 2,825,362 | Hicks | Mar. 4, 1958 |
| 2,881,801 | McCormick | Apr. 14, 1959 |